United States Patent
Chaise et al.

(10) Patent No.: US 8,985,319 B2
(45) Date of Patent: Mar. 24, 2015

(54) HYDROGEN STORAGE TANK HAVING METAL HYDRIDES

(75) Inventors: Albin Chaise, Grenoble (FR); Manon Elie, Grenoble (FR); Olivier Gillia, Sassenage (FR); Michel Planque, Seyssins (FR)

(73) Assignee: Commissariat á l'ènergie atomique et aux énergies alternatives, Paris (FR)

( * ) Notice: Subject to any disclaimer, the term of this patent is extended or adjusted under 35 U.S.C. 154(b) by 405 days.

(21) Appl. No.: 13/509,461

(22) PCT Filed: Nov. 10, 2010

(86) PCT No.: PCT/EP2010/067187
§ 371 (c)(1),
(2), (4) Date: May 11, 2012

(87) PCT Pub. No.: WO2011/058044
PCT Pub. Date: May 19, 2011

(65) Prior Publication Data
US 2012/0222972 A1    Sep. 6, 2012

(30) Foreign Application Priority Data
Nov. 13, 2009    (FR) ..................................... 09 58022

(51) Int. Cl.
B65D 85/00 (2006.01)
F17C 11/00 (2006.01)
C01B 3/00 (2006.01)

(52) U.S. Cl.
CPC ............. F17C 11/005 (2013.01); C01B 3/0005 (2013.01); C01B 3/0026 (2013.01);
(Continued)

(58) Field of Classification Search
USPC ........... 206/0.6, 0.7; 29/422, 428, 455.1, 773, 29/801; 96/108, 121, 126, 146, 154; 137/15.01; 165/157, 162; 220/562–565
See application file for complete search history.

(56) References Cited

U.S. PATENT DOCUMENTS

| | | | |
|---|---|---|---|
| 4,402,915 | A | 9/1983 | Nishizaki et al. |
| 4,723,595 | A | 2/1988 | Yasunaga et al. |

(Continued)

FOREIGN PATENT DOCUMENTS

| | | |
|---|---|---|
| FR | 2 895 487 | 6/2007 |
| FR | 2 931 142 | 11/2009 |

(Continued)

OTHER PUBLICATIONS

U.S. Appl. No. 13/509,303, filed May 11, 2012, Gillia, et al.
(Continued)

Primary Examiner — Luan K Bui
(74) Attorney, Agent, or Firm — Oblon, Spivak, McClelland, Maier & Neustadt, L.L.P.

(57) ABSTRACT

A hydrogen storage tank by absorption into a hydrogen storage material, the tank having a longitudinal axis and including an enclosure and an inner structure provided within the enclosure. The inner structure includes a plurality of stages and a heat exchange system within the inner structure, each stage including a plurality of compartments distributed into a plurality of rows directed along the longitudinal direction, each compartment having a semi-cylindrical shape, and each compartment containing a hydrogen storage material, wherein the material has been introduced through the opening.

21 Claims, 3 Drawing Sheets

(52) U.S. Cl.
CPC ............ *C01B3/0031* (2013.01); *C01B 3/0036* (2013.01); *C01B 3/0042* (2013.01); *Y02E 60/321* (2013.01); *Y02E 60/327* (2013.01)
USPC .............. 206/0.7; 29/428; 96/126; 137/15.01

(56) References Cited

U.S. PATENT DOCUMENTS

| | | | | |
|---|---|---|---|---|
| 5,582,048 | A | 12/1996 | Schotthoefer | |
| 7,320,726 | B2 * | 1/2008 | Shih et al. .................... | 206/0.7 |
| 7,326,281 | B2 * | 2/2008 | Fujita et al. ................... | 206/0.7 |
| 7,431,756 | B2 * | 10/2008 | Myasnikov et al. ............ | 96/126 |
| 7,455,723 | B2 | 11/2008 | Voss et al. | |
| 7,875,107 | B2 * | 1/2011 | Mori et al. ..................... | 206/0.7 |
| 8,051,977 | B2 * | 11/2011 | Fujita et al. ................... | 206/0.7 |
| 8,646,597 | B2 * | 2/2014 | Yang et al. .................... | 206/0.7 |
| 2003/0209149 | A1 * | 11/2003 | Myasnikov et al. ............ | 96/146 |
| 2004/0129048 | A1 * | 7/2004 | Myasnikov et al. ............ | 72/121 |
| 2005/0188847 | A1 | 9/2005 | Fujita et al. | |
| 2005/0211573 | A1 | 9/2005 | Myasnikov et al. | |
| 2006/0266219 | A1 | 11/2006 | Ovshinsky et al. | |
| 2007/0144349 | A1 | 6/2007 | Voss et al. | |
| 2011/0138748 | A1 | 6/2011 | Olivier et al. | |
| 2012/0222971 | A1 | 9/2012 | Gillia et al. | |

FOREIGN PATENT DOCUMENTS

| | | |
|---|---|---|
| JP | 59-50300 | 3/1984 |
| JP | 60-26897 | 2/1985 |
| JP | 61-244997 | 10/1986 |
| JP | 2006-291993 | 10/2006 |
| WO | WO 2009/138406 A1 | 11/2009 |

OTHER PUBLICATIONS

International Search Report issued Apr. 1, 2011 in Application No. PCT/EP2010/067187.

French Preliminary Search Report issued Aug. 30, 2010, in Patent Application No. FR 0958022 (FA 728826) with English translation of Category of Cited Documents.

S. T. McKillip, et al., "Stress analysis of hydride bed vessels used for tritium storage", Fushion Technology, vol. 21, Mar. 1992, pp. 1011-1016.

B. Y. Ao, et al. "A study on Wall stresses induced by LaNi5 Alloy Hidrogen absorption-desorption cycles", Journal of Alloys and Compounds 390, (Elsevier), 2005, pp. 122-126.

Office Action issued Sep. 8, 2014 in Japanese Patent Application No. 2012-538320 (with English translation).

* cited by examiner

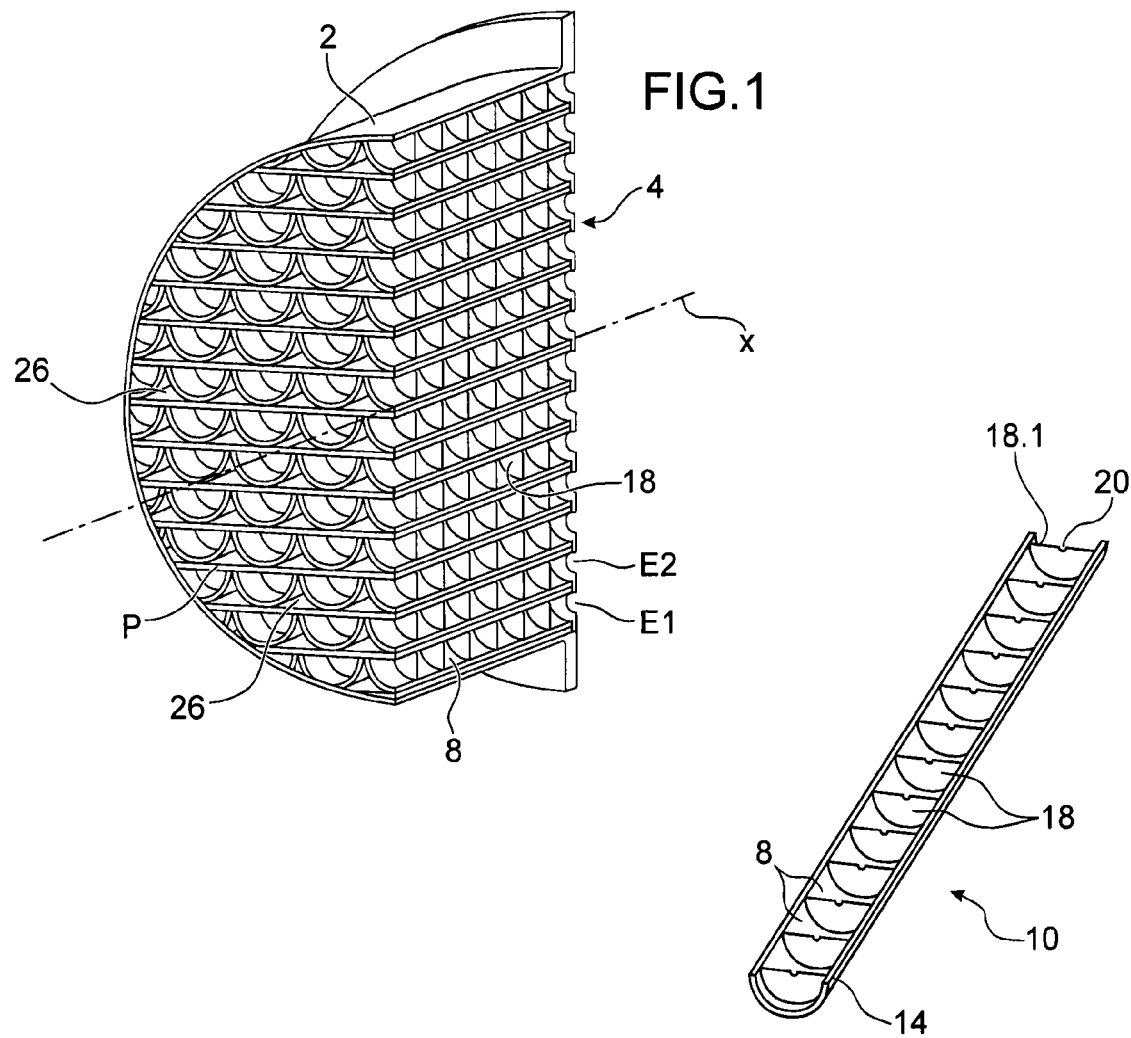

HYDROGEN STORAGE TANK HAVING METAL HYDRIDES

TECHNICAL FIELD AND PRIOR ART

The present invention relates to a tank for storing hydrogen in the form of metal hydrides.

Because of a reduction in the crude oil reserves, in particular, alternative energy sources to petroleum are being searched for. One of the promising carriers of the alternative energy sources is hydrogen which can be used in fuel cells to generate electricity.

Hydrogen is available in a huge amount, it can be produced from coal, natural gas or other hydrocarbons, but also simply by electrolysis of water using for example the electricity generated by solar or wind energy.

Hydrogen cells are already used in some applications, for example in automotive vehicles but still are not widely used, in particular due to the precautions to be taken and difficulties in the hydrogen storage.

Hydrogen can be stored as hydrogen which is compressed between 350 and 700 bars, which raises safety problems. Tanks must then be provided that can withstand these pressures, and besides it should be reminded that these tanks, when mounted in vehicles, can be subjected to impacts.

It can be stored as a liquid, however this storage only gives a low yield and does not allow a storage for a long time. The hydrogen volume passing from the liquid state to the gas state under the standard pressure and temperature conditions produces an increase in its volume by a factor of about 800. The liquid form hydrogen tanks are not generally very resistant to mechanical impacts, and this raises serious safety problems.

There is also the storage of so-called "solid" hydrogen as hydride. This storage allows a high storage density and implements a moderate hydrogen pressure while minimising the storage energy impact on the global yield of the hydrogen line, that is from its production to its conversion into another energy source.

The solid storage principle of hydrogen as hydride is the following: some materials and in particular some metals have the capacity to absorb hydrogen to form a hydride, this reaction is called absorption. The formed hydride can again give hydrogen gas and a metal. This reaction is called desorption. The absorption or desorption occur depending on hydrogen partial pressure and temperature.

The absorption and desorption of hydrogen on a metal powder or matrix M are made according to the following reaction:

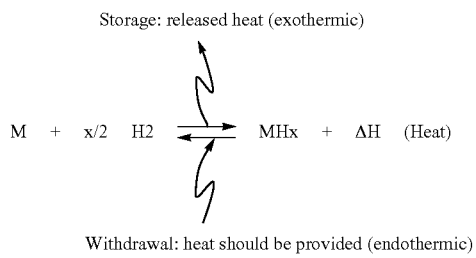

Storage: released heat (exothermic)

$$M + x/2\ H_2 \rightleftarrows MH_x + \Delta H\ (Heat)$$

Withdrawal: heat should be provided (endothermic)

M being the metal powder or matrix,
MHx being the metal hydride.

For example, a metal powder is used that is put into contact with hydrogen, an absorption phenomenon occurs and a metal hydride is formed. The hydrogen release is performed according to a desorption mechanism.

The hydrogen storage is an exothermic reaction, i.e. which releases heat, whereas the hydrogen release is an endothermic reaction, i.e. which absorbs heat.

It is attempted in particular to have a quick loading of the metal powder in hydrogen. To achieve such a quick loading, the heat produced during this loading should be removed to prevent the hydrogen absorption on the metal powder or matrix from being slowed down. During the hydrogen unloading, heat is provided consequently, the cooling and heating efficiency condition the loading and unloading flow rates.

Quasi systematically, the hydride and metal, which are both in a form of powder in tanks, have a density difference between 10% and 30%.

This variation in density within the tank has two results:
 on the one hand, the appearance of stresses inside the powder grains during absorption-desorption cycles, which causes them to be fractioned into smaller grains. This phenomenon is called decrepitation;
 on the other hand, the swelling of powder grains during the hydrogen absorption and the deswelling of grains during desorption. A free volume above the powder is then provided to take account of this swelling.

The decrepitation phenomenon and the swelling phenomenon are responsible for a gradual densification of the powder bed as the number of absorption-desorption cycles increases. Indeed, the decrepitation causes the appearance of finer and finer powders which migrate through gravity towards the tank bottom through the grain network. Moreover, when the hydrogen flow velocity is sufficiently high, grains are moved and rearranged in the tank. Besides, the powder bed tends to be retracted, that is its volume is decreased during a desorption which leaves an empty space between the tank walls and the hydrogen storage material bed. A powder migration occurs through gravity via this space and fills it. During the following absorption, the power of the formed hydride will not behave as a fluid. In particular, the powder bed level in the tank is not that achieved during the preceding absorption. Indeed, the frictions between grains and against the tank wall prevent the powder bed from being freely expanding. The swelling of the powder grains is then compensated for by a reduction in the porosity size. The hydrogen/hydride storage material bed is thus gradually densified under the course of hydriding cycles.

By "hydriding cycle", it is meant an absorption phase followed by a desorption phase.

Since the powder bed is less and less porous, the necessary stresses to further reduce the porosity are increased at each hydriding, therefore the swelling of grains induces increasing stresses on the tank walls. After a number of cycles, the stresses are such that the tank walls can undergo plastic deformations and break.

Document US 2005/0211573 describes a cylindrical shape tank for storing hydrogen as hydride and comprising compartments in the form of angular sectors distributed about the axis of the tank. The compartments comprise radial cells wherein the hydrogen storage material is provided. This architecture causes the appearance of stresses due to the densification of the hydrogen/hydride storage material onto the outer enclosure. During hydriding cycles, these stresses increase. Beyond a number of cycles, the stresses can cause the breaking of the tank. Accordingly, this tank should be thoroughly monitored.

Document US 2005/0211573 describes a cylindrical tank comprising tubes parallel to the tank axis which are loaded in hydrogen storage material, wherein the tubes are dipped in the heat transfer fluid. This architecture is not efficient to withstand the expansion phenomena of the hydrogen storage material during the absorption-desorption cycles. Indeed, under the effect of the tank vibration or movement, the hydrogen storage material is likely to accumulate at one end of the tubes and to completely fill a portion of the tube, i.e. to be in contact with the entire inner surface of the tube. Upon swelling the hydrogen storage material in these portions of the tube, very high stresses are induced onto the walls of the tubes, which can cause the breaking thereof.

Besides, this tank has a low storage volume density since it is necessary to leave a large space unoccupied by the hydrogen storage material. Indeed, this horizontal tubular tank type should only be partially filled by powder at most 60% and preferably 40% of the inner volume of the exchanger, in order to avoid too high strains on the tank walls because of the swelling of the hydride grains.

Document US 2004/0129048 describes a hydrogen tank wherein hydrogen is stored as metal hydride. This cylindrical shaped tank comprises powder filled elongated cells. Water circulation tubes are provided in some channels to remove heat.

On the one hand, this device does not provide a homogeneous powder distribution throughout the tank, which can cause the application of stresses damaging the structure. On the other hand, the heat exchanges are not optimum. Furthermore, the channel structure is complex to perform, and the powder filling is tedious.

Consequently, one objet of the present invention is to provide a hydrogen storage tank offering a very good resistance to stresses due to the densification of the hydrogen storage material, while offering a satisfactory storage volume density.

DESCRIPTION OF THE INVENTION

The objects set out above are achieved by a hydrogen tank having a longitudinal axis comprising a containment outer enclosure and an inner structure for distributing the metal hydride, said structure comprising a plurality of superimposed stages, each stage comprising a plurality of compartments extending in the direction of the longitudinal axis, the channels comprising a bottom and two side walls and two transverse walls, the side walls form an angle strictly higher to 90° with the bottom.

In other words, the compartment according to the present invention has a flare shape, the compartments being provided so that the side walls flare upwards, the material lying in the bottom of the compartment, which applies the strongest stresses, can be moved more easily upwards, the stresses applied by the powder in the lower part of the compartments are then reduced.

At the connection between channels, the tangents to the side walls are advantageously intersecting which enables the volume of the channel to be increased with respect to that of the inter-channel space.

Advantageously, the compartments have a semi-cylindrical shape.

Preferably, the material of the side walls and the bottom is non-porous.

In another example, the compartments have a flat bottom and side walls deviating from each other to define a flared shape. This shape enables the volume density of the hydrogen storage material to be increased.

Therefore, the subject-matter of the present invention is a hydrogen storage tank by absorption into a hydrogen storage material, said tank having a longitudinal axis and comprising an enclosure and an inner structure provided within the enclosure, the inner structure comprising a plurality of stages and a heat exchange system within the inner structure, each stage comprising a plurality of compartments distributed into a plurality of rows directed along the longitudinal direction, each compartment comprising a bottom, two side walls, two transverse walls and an opening, the bottom being intended to be provided under the opening, two adjacent compartments of a same row having a common transverse partition wall, two compartments of two adjacent rows being made integral through their side walls, plates being provided between two successive stages, forming for the upper stage a support and for the lower stage a cover, said plates being intended to be substantially horizontal, the opening of each compartment having a higher transverse direction than that of the bottom of said compartment and the angle formed between each of side walls and the bottom being strictly higher than 90°, each compartment containing a hydrogen storage material.

Preferably, the hydrogen storage material has been introduced through the opening upon mounting the tank.

Preferably, the material of the side walls and the bottom is non-porous.

According to one exemplary embodiment, the volumes defined between two side walls of two rows of adjacent compartments and the support plate form heat transfer fluid flow ducts.

According to another exemplary embodiment, the heat transfer fluid directly flows in the ducts contacting the side walls.

Advantageously, each compartment has a semi-cylindrical shape, wherein the cylinder from which the compartment comes has a circular cross-section.

The compartments can also comprise a flat bottom and concave or planar side walls.

The side walls can intersect the plane of the cover plate.

In another exemplary embodiment, the side walls of the compartment of a row are made as a single piece.

The tank of the present invention can comprise subassemblies formed by a plurality of compartments of a stage, said compartments being integral to the support plate, said subassemblies being stacked to form the inner structure. Each duct can thus be tightly connected to the heat transfer fluid circuit.

In one alternative embodiment, the tank according to the present invention can comprise subassemblies formed by a plurality of compartments of a stage, said compartments being integral to the cover plate, said subassemblies being stacked to form the inner structure. The cover can tightly close the compartments, the inner structure being provided in a heat transfer fluid bath.

The transverse walls advantageously comprise at least one port to enable hydrogen to pass from one compartment to the other of a same channel.

In one alternative, a porous tube passes through the compartments of a same row to feed hydrogen to said compartments. Advantageously, the tube is at the bottom of the compartments and substantially in their plane of symmetry.

The compartments are preferentially made of a material providing a good heat exchange coefficient, such as aluminium or copper.

Another subject-matter of the present invention is also a method for making a tank according to the present invention, comprising the steps of:

a) making channels having a transverse cross-section identical to those of the compartments, b) attaching transverse partition walls (18) in the channels bounding the compartments, c) making a plate integral to said channels, d) placing the hydrogen storage material individually into each compartment, e) repeating steps a), b) etc.) until the required number of subassemblies is obtained, f) stacking said subassemblies, g) placing the stack into an enclosure, h) feeding hydrogen.

The channels are for example made by folding a metal sheet.

In one exemplary embodiment, step c) occurs before step b) and wherein the plate tightly seals the cover channels. The stack can thus be provided in a heat transfer fluid bath.

In an exemplary embodiment, in step b), the plate is made integral to the bottoms of the channels, forming the cover of the lower stage. The ducts which are bounded between the channels and the cover of the lower stage can be tightly connected to the heat exchange system.

BRIEF DESCRIPTION OF THE DRAWINGS

The present invention will be better understood using the following description and the appended drawings wherein:

FIG. 1 is a partial perspective view of an exemplary embodiment of a tank according to the present invention and wherein the inner structure of a tank according to the present invention is visible, FIG. 2 is a perspective view of an isolated stage of the structure of FIG. 1, FIG. 3A is a perspective view of part of the stage of FIG. 2.

DETAILED DESCRIPTION OF PARTICULAR EMBODIMENTS

In FIG. 1, an exemplary embodiment of a hydrogen tank according to the present invention can be seen.

Figure 5:
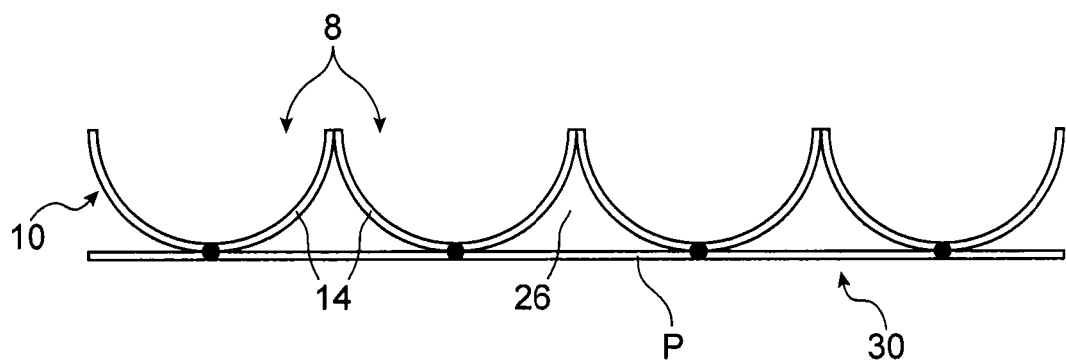
FIG. 5 is a longitudinal cross-section view of another exemplary embodiment of stages of the inner structure of the tank.

The tank comprises an outer enclosure 2 that can withstand the hydrogen pressure, and an inner structure 4 for receiving a hydrogen storage material 6 represented in FIG. 5.

The outer enclosure 2 has, in the example represented, a circular section cylinder shape having a longitudinal axis X. This shape is advantageous for the pressure resistance, but is in no way limiting, the outer enclosure 2 could for example have a toric or square cross-section.

The tank is intended to be substantially horizontally provided in operation. Accordingly, the axis X is intended to be in a horizontal position or substantially in a horizontal position.

In the present application, the elements or parts of elements are said to be "upper" and "lower" when they are intended to have a high or low position in the representation of the tank of FIG. 1, but this is in no way limiting.

The outer enclosure 2 is for example of stainless steel, aluminium or woven composite material. The pressure level to which the enclosure can be subjected is between 0 and 200 bar.

Generally, the tank is connected to a hydrogen flow circuit connected to one or both longitudinal ends of the enclosure to load the tank with hydrogen and unload the hydrogen off the tank. Moreover, a heat exchange system which will be described later ensures the flow of a heat transfer fluid from one longitudinal end to the other. The tank is thus generally subjected to longitudinally directed hydrogen and heat transfer fluid flows.

The tank, and more particularly the inner structure, thus advantageously have an architecture suitable for the longitudinal flows. But the present invention can be suitable for flows having another orientation.

The inner structure 4 comprises a plurality of superimposed stages E1, E2, . . . En, n being a natural number.

Each stage E1, E2, . . . En comprises a plurality of compartments 8 distributed in parallel rows, each containing the hydrogen storage material 6. The distribution of the compartments is advantageous because of the longitudinal direction of the hydrogen and heat transfer fluid flows.

The compartments 8 are advantageously made from channels 10 having longitudinal axes parallel to the longitudinal axis X of the enclosure. The channels are adjacent and are integral through their side walls. These are particularly visible in FIGS. 2 and 3A.

The channels comprise a bottom 12, two sides walls 14 and a cover.

In the example represented, the channels have the shape of two half tubes intersected along a plane passing through their axis. In this exemplary embodiment, the bottom merges with the side walls.

Figure 3B:
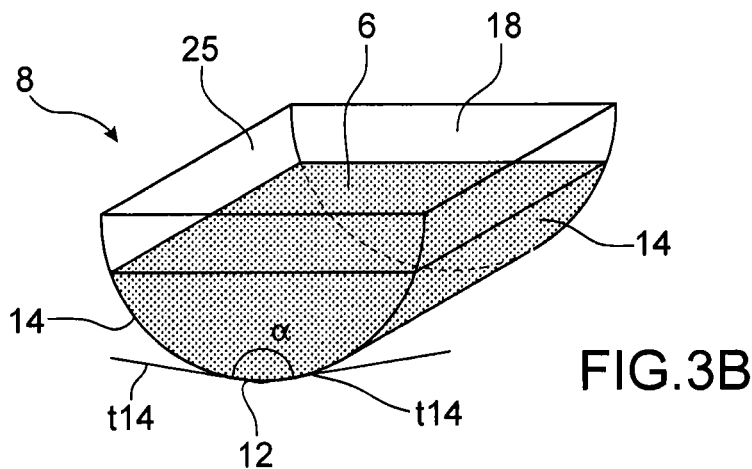
FIG. 3B is a perspective view of a single compartment of FIG. 3A.
Figure 4:
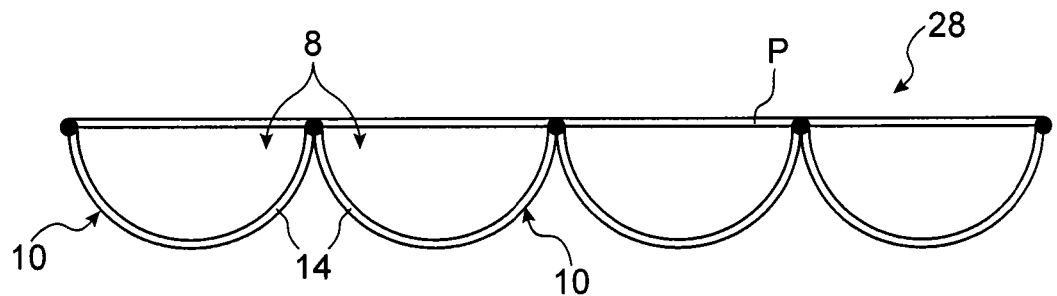
FIG. 4 is a transverse cross-section view of FIG. 3.

In FIG. 3B in which a single compartment 8 is represented, each side wall 14 forms with the bottom an angle $\alpha$ strictly higher than 90° so that the compartments 8 have a flared shape, facilitating the movement of the powder of the hydrogen storage material upon swelling. More precisely, in the example represented, these are the tangents $t_{14}$ to the walls 14 which form an angle strictly higher than 90° with the bottom 12.

The channels 10 are connected to each other at their side walls.

Advantageously, the tangents of the adjacent side walls 14 are intersecting, which enables the volume of the channels to be increased with respect to the volume of the space between channels, which will be described later, and thus the volume density of the tank of hydrogen storage material to be increased. In the example where the channels have the shape of half tubes intersected along a plane passing through their axis, the tangents to their side walls are nearly orthogonal to the bottom.

Compartments 8 are bounded in the channels by transverse partition walls 18 attached in the channels. These partition walls 18 prevent the hydrogen storage material from moving longitudinally and accumulating at one end of the channels. Advantageously, the transverse partition walls 18 are regularly distributed to bound compartments having substantially identical sizes. In this exemplary embodiment, the transverse partition walls 18 have a half disk shape.

The tank comprises means for feeding and collecting hydrogen to the compartments. For example, the transverse walls 18 can comprise at least one through hole 20 to enable hydrogen to flow from one compartment to the next one of a channel, enabling the hydrogen storage material to be loaded with hydrogen and the hydrogen released upon desorption to be collected. Preferably, this hole has a low cross-section to restrict the flow of hydrogen storage material from one compartment to the other. Advantageously, this hole is lying in the upper part of the partition walls, further reducing the hydrogen storage material circulation risks. In the example represented, this is a notch 20 at the free end 18.1 of the partition walls 18. A free volume 25 is provided above the hydrogen storage material to compensate for the swelling of the hydrogen storage material, this free volume 25 enables hydrogen to flow from one compartment 8 to the other.

A gap between the cover and the top of the transverse walls can also ensure the hydrogen feed and collection.

Alternatively, a hydrogen feeding tube (not shown) running in the compartments 8 of a same channel can also be provided. This tube is for example porous.

The porous tube ensures a hydrogen distribution in each compartment of a same channel at a homogeneous pressure.

Advantageously, the tube is lying in the low part of the channel and/or in the plane of symmetry of said channel, which does not impede the powder swelling during absorption phases.

In the case where feeding tubes are implemented, the transverse side walls 18 and the tube can be made integral and the assembly thus formed can be placed in the channel, which simplifies the making of the compartments. The partition walls 18 can also be made integral to a longitudinal rod enabling the partition walls to be easily and quickly placed.

The compartments are closed by a cover. Advantageously, this is a cover common to all the compartments of a same stage having the form of a plate.

Thus, as seen in a transverse cross-section view, the inner structure comprises cover plates P for the compartments of the lower stage and providing support for the compartments of the upper stage.

Longitudinal ducts 26 are provided between the plate P and the outer faces of the channels 10. In the example represented, these ducts 26 have a transverse cross-section having substantially a isosceles triangle shape whose two sides of a same length are concave.

The structure of the invention isolates the stages from each other preventing the hydrogen storage material 6 which is in the powder form from falling through gravity towards a lower stage and from accumulating in the lower part of the tank. The partition walls 18 bound the longitudinal movements and the side walls 14 restrict the transverse movements. Thanks to the invention, the distribution of the hydrogen storage material which has been set upon assembling the tank is maintained, this distribution is homogeneous and ensures a resistance to stresses due to densification.

The tank also comprises a heat exchanger for extracting heat from the compartments 8 during the absorption phase and for providing heat during the desorption phase.

The heat exchanger is formed in the ducts 26 and enables the heat transfer fluid to be flowed within the inner structure 4 as close to the hydrogen storage material as possible. Particularly advantageously, the fluid directly flows in the ducts 26 and is thus directly contacting the upper surface of the compartments 8, which makes heat extraction and feeding very efficient.

Alternatively, it can be contemplated to provide pipes wherein the heat transfer fluid flows in the ducts 26. In this case, the connection to the heat transfer fluid feeding system is simplified.

Advantageously, the channels are made of a material having a good heat exchange coefficient, like aluminium or copper, ensuring a good exchange between the heat transfer fluid and the hydrogen storage material. These materials further have the advantage of being easily shaped. Preferably, the material of the side walls and the bottom is non-porous.

The inner structure can be made from subassemblies having different structures.

In FIG. 2, a first exemplary embodiment of the subassembly 28 of the inner structure 4 of a tank according to the present invention can be seen. In this exemplary embodiment, the subassemblies 28 are such that they make the inside of the compartments perfectly pressure tight and independent from the rest of the tank.

In this example, the channels 10 are individually made, for example from tubes intersected along a plane passing through their axis, which enables two channels to be simultaneously made. The transverse partition walls 18 are then attached in the channels for example through welding, brazing or soldering. It is also possible to use a folded metal sheet the "folds" of which are welded, brazed or soldered to a upper planar plate.

As indicated above, the transverse partition walls 18 can also be preassembled on a porous tube, or on rods and this assembly can be placed in the channels.

The channels are then attached to each other by their side walls for example through welding, brazing or soldering, so as to form a single structure.

The hydrogen storage material, which can be in the form of a powder or a solid block is then provided in each compartment.

A flange (not represented) is then attached through welding, brazing or soldering to the ends of the tubes under a controlled atmosphere, so as to tightly close the longitudinal ends of the channels.

The plate is then tightly attached onto the channels, at the upper ends of the side walls, for example through welding, brazing or soldering.

It is worthy of note that these steps are preferably conducted in a glove box since the hydrogen storage material is very sensitive to oxidizing atmospheres.

The tight subassemblies thus made are then stacked until the required number of stages is reached.

The stages can be made integral to each other or not.

If they are not made integral to each other, feeding each stage with hydrogen is advantageously flexible, restricting the leak risks during a movement of a subassembly with respect to another one.

If the stages are kept motionless with respect to each other, the feeding circuit can be rigid, which simplifies its construction.

The connection to the different channels 10 to the hydrogen circuit is then made.

In the example of FIG. 1, the tank has a circular cross-section, so that the subassemblies have a varying size depending on the stage they form. In the case of a tank having a square cross-section, the subassemblies are identical.

These subassemblies 28 have the advantage of being handled to be easily because the hydrogen storage material is tightly enclosed in the channels.

In this exemplary embodiment, thus assembling the inner structure 4 can be provided in a "water case" type shell, the inner structure 4 being dipped in the heat transfer fluid, and a hydrogen circuit is connected to the channels. The shell resists to the heat transfer fluid pressure, the resistance to the hydrogen pressure being ensured by the compartments themselves.

The heat transfer fluid then fills the ducts 26. The heat exchanger comprises a device for moving this fluid so as to improve the heat extraction and feeding, such as a pump.

This assembly is then provided in the enclosure which forms the water case.

The heat exchanger is thus made relatively simply.

This exemplary embodiment of the heat exchanger is in no way limiting and a tight connection could be made at each of the ducts 26 to a heat transfer fluid circulation system.

In FIG. 5, another exemplary embodiment of the subassemblies 30 for making the inner structure of FIG. 1 can be seen. In this example, the channels are made in a single piece from a folded sheet metal in a succession of gutters, forming the channels as represented in FIG. 5. The subassemblies are made so as to make the heat transfer fluid circulation ducts 26 tight and independent from the rest of the tank.

Then, the bottom of each gutter is attached to a planar plate, for example through welding or brazing.

The heat transfer fluid circulation ducts 26 are then tightly sealed for example by means of flanges attached through welding or brazing.

The partition walls 18 are then mounted in the channels as explained above, and the hydrogen storage material 6 is provided as a powder or blocks into each compartment.

The subassemblies 30 are then stacked until the required number of stages is reached.

The stages are for example made integral to each other by means of flanges for connecting with the heat transfer fluid circuit.

Thus assembled inner structure can then be placed in the enclosure 2 resistant to the gas pressure and is filled with a hydrogen atmosphere. The ducts 26 are then provided to resist to the pressure difference between the heat transfer fluid and hydrogen. The heat exchanger circuit is connected to the fluid circulation ducts 26, through the flanges.

Figure 6A:
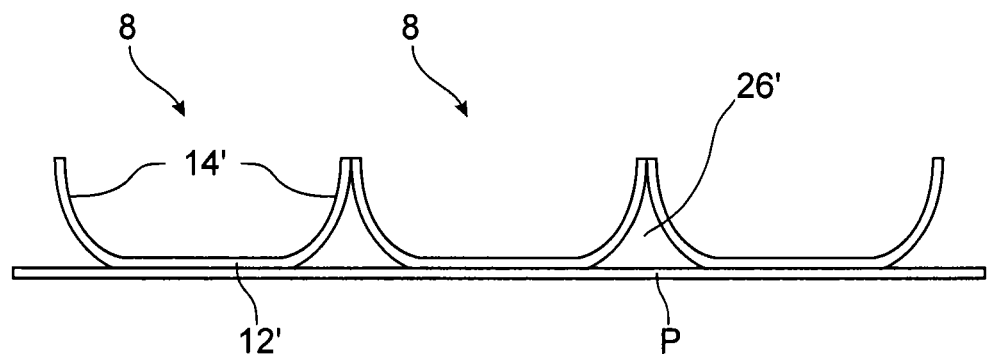
FIGS. 6A and 6B are transverse cross-section views of other exemplary embodiments of the compartments according to the present invention.
Figure 6B:
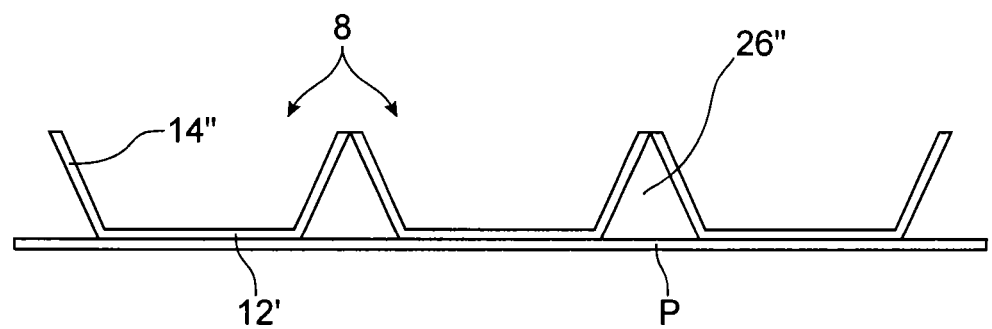

In FIGS. 6A and 6B, alternative embodiments of the compartments according to the present invention can be seen.

In FIG. 6A, the compartments have a flat bottom 12' and two concave side walls 14', the angle between the tangent $t_{14'}$ and the bottom 12' is strictly higher than 90°.

In FIG. 6B, the compartments comprise a flat bottom 12" and two planar tilted side walls 14" and deviating from each other forming a flared opening, the angle between the walls 14" and the bottom 12" is strictly higher than 90°.

These compartments have the advantage of increasing the volume density of the storage material. Indeed, the volume of the ducts 26', 26" between the compartments being reduced, the volume of the compartments is thereby increased, enabling the amount of hydrogen storage material to be increased. It is worthy of note that the cooling achieved by these ducts 26' having a reduced size is however sufficient for a vast majority of operating conditions of the hydride based tanks.

By way of example, the material provided in the compartments can be comprised of one or more materials used for storing hydrogen. These hydrogen storage material can be selected from different families such as AB, $A_2B$, $A_2B_7$, $AB_2$ or $AB_5$ or be a mixture of these families of materials.

The reversible metal hydrides of the formula $A_mB_n$ consist of an element A forming a stable hydride such as alkaline or alkaline earth materials like lithium, calcium or magnesium, fourth or fifth column transition metals like zirconium, titanium, or finally metal rare earth such as lanthanum, cerium and of an element B forming an unstable hydride in the standard temperature and pressure conditions, such as most transition metals like chromium, cobalt, nickel or iron.

These materials can have a body-centred cubic (bcc) structure, a face-centred cubic (fcc) or a C-14 or C-15 type crystallographic structure.

For example, these materials can be Mg, Mg—Ni, Mg—Cu, Ti—Fe, Ti—Mn, Ti—Ni, Ti—V, Mn—Ni, Ti—V—Cr, Ti—V—Fe. The hydrogen absorption capacities depending on the pressure and temperature used vary according to the hydrogen storage materials.

Other hydrogen absorbing materials such as complex chemical hydrides with light elements such as alanates (NaAlH4), Li and B base hydrides such as LiBH4, NaBH4, or otherwise imides or amides, can also be used in the described geometry in the present invention.

The operation of this tank will now be explained.

When the tank needs to be loaded with hydrogen, hydrogen is flowed in the tank, for example through the porous pipes. Since the absorption reaction is exothermic, heat is released. The heat is simultaneously discharged by flowing a cool heat transfer fluid in the ducts 26, which is in contact with the outside surface of the compartments. The more quickly and efficiently the heat is discharged, the quicker the loading of the tank. The hydrogen loaded material then forms a metal hydride. As already explained, the material swells due to absorption and is decrepitate, to form powder.

When hydrogen contained in the tank needs to be used, the hydrogen pressure is lowered in the tank or the hydride is heated via the ducts 26 of the heat exchanger. The hydrogen is desorbed. The thus released hydrogen flows from one compartment to the other via the notches made in the upper part of the partition walls 18 and is collected at a longitudinal end of the tank.

The loading and unloading temperature of the tank ranges for example from −20° C. to 400° C. The loading pressure ranges for example from 0.1 bar to 200 bar $H_2$, and the unloading pressure ranges for example from 100 bar to 0 bar (absolute).

Thanks to the present invention, and to the particular choice of the compartment shape, the hydride powder can occupy between 40 and 60% of the total volume of a tank, a satisfactory storage volume density is thus obtained. It is possible to further increase the storage density by using compartments having a flat bottom such as those represented in FIGS. 6A and 6B, which enables the storage volume of the compartments 8 to be increased.

Figure 7A:
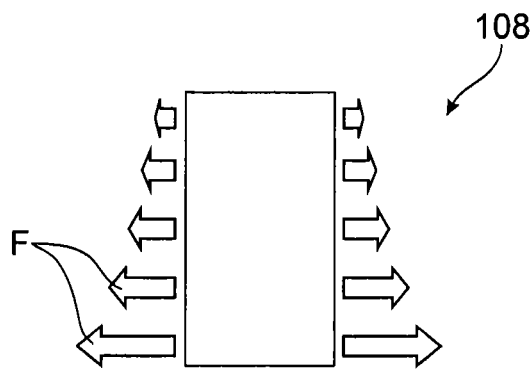
FIGS. 7A and 7B are schematic representations of stresses exerted by the hydrogen storage material onto the side walls of the compartment according to the present invention and a compartment of the state of the art respectively.
Figure 7B:
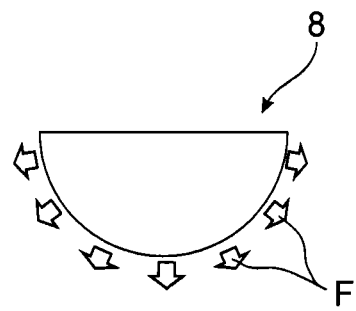

Besides, the semi-cylindrical shape, and more generally the flared shape of the compartments 8 enables stresses F to be prevented from accumulating at the bottom of the compartments as it is schematically shown in FIG. 7A whereas in the case of a rectangular cross-section compartment 108, this concentration of stresses F occurs (FIG. 7B). Indeed, the powder volume at the bottom of the cell is the densest and likely to exert the most stresses on the walls. Besides, the highly flared shape of the bottom of the compartment allows the powder to be nearly free to expand. The stresses exerted onto the wall are even and with a low amplitude.

Whereas, when a powder bed is contained in a rectangular compartment, since the walls are vertical throughout their height, the stresses exerted onto the wall are low in the top part: the frictions are lesser and the powder is freer to expand, on the other hand stresses are very high in the bottom of the compartment where the material is contained under the effect of friction forces onto the side walls at the top part of the compartment.

In the exemplary compartment according to the invention of FIG. 7A, the walls at the top of the semi-spherical cell are certainly vertical, but in the same way, the powders at the top of the cell are only likely to exert low stresses, which is not detrimental.

Furthermore, thanks to the method for making the inner structure, the material is individually placed into each compartment, which enables the manufacture to be provided with a good distribution of the one which is in particular maintained thanks to the transverse partition walls 18. These transverse partition walls 18 prevent the powder from moving at a large scale in the tank, which makes the tank according to the invention usable in on-board or movable applications.

The invention also provides for an efficient reaction heat transfer from the hydride bed to the heat transfer fluid. Indeed, the contact surface between the fluid and the compartments is large, which allows the use of a fluid having a low exchange coefficient without being detrimental to the performances in terms of hydrogen absorption and desorption flow rates. The radius of the channels controls the maximum absorbed or desorbed hydrogen flow rates: the radius is also the characteristics length of heat diffusion of the tank. The lower this distance, the quicker the reaction heat transfer.

For example, the radius is between 1 cm and 5 cm, and is advantageously equal to 2 cm. The length of the compartments is equal about to 2 times the radius. The tank dimensions in width, length and height are for example between 5 times the radius and 100 times the radius of the half tubes.

The tank according to the present invention can be applied to all the applications implementing hydrogen storage, both in fields implementing a storage of high amounts and those requiring a storage of small amounts.

For example, it can be used as a tank for locomotive means, such as watercrafts, submarines, such as private cars, buses, lorries, building or agricultural machines and two wheeled vehicles.

It can also be used in power supplies for portable devices such as portable electronic apparatuses (portable phone, portable computers . . . ).

It can also be applied to storage systems for higher amounts, such as for generator sets, for storing hydrogen generated in high amounts thanks to the energy from wind turbines, photovoltaic panels or geothermics.

The invention claimed is:

1. A hydrogen storage tank by absorption into a hydrogen storage material, the tank having a longitudinal axis and comprising:
    an enclosure; and
    an inner structure provided within the enclosure, the inner structure comprising a plurality of stages and a heat exchange system within the inner structure,
    each stage comprising a plurality of compartments distributed into a plurality of rows directed along the longitudinal direction,
    each compartment comprising a bottom, two side walls, two transverse walls, and an opening, the bottom being configured to be provided under the opening, two adjacent compartments of a same row having a common transverse partition wall, two compartments of two adjacent rows being made integral through their side walls, plates being provided between two successive stages, forming for an upper stage a support and for a lower stage a cover, the plates configured to be substantially horizontal, the opening of each compartment having a higher transverse direction than that of the bottom of the compartment and an angle formed between each of side walls and the bottom being strictly higher than 90°,
    each compartment containing a hydrogen storage material, wherein volumes defined between two side walls of two rows of adjacent compartments and the support plate form heat transfer fluid flow ducts.

2. The tank according to claim 1, wherein the heat transfer fluid directly flows in the ducts contacting the side walls.

3. The tank according to claim 1, wherein each compartment has a semi-cylindrical shape, wherein the cylinder from which the compartment comes has a circular cross-section.

4. The tank according to claim 1, wherein each compartment has a flat bottom and concave or planar side walls.

5. The tank according to claim 1, wherein the side walls are intersecting the plane of the cover plate.

6. The tank according to claim 1, wherein the side walls of the compartment of a row are made as a single piece.

7. The tank according to claim 1, comprising subassemblies formed by a plurality of compartments of a stage, the compartments being integral to the support plate, the subassemblies being stacked to form the inner structure.

8. The tank according to claim 1, wherein each duct is tightly connected to the heat transfer fluid circuit.

9. The tank according to claim 1, comprising subassemblies formed by a plurality of compartments of a stage, the compartments being integral to the cover plate, the subassemblies being stacked to form the inner structure.

10. The tank according to claim 9, wherein the cover tightly closes the compartments, the inner structure being provided in a heat transfer fluid bath.

11. The tank according to claim 1, wherein the transverse walls comprise at least one port to enable hydrogen to pass from one compartment to the other of a same channel.

12. The tank according to claim 1, wherein a porous tube passes through the compartments of a same row to feed hydrogen to the compartments.

13. The tank according to claim 12, wherein the tube is at the bottom of the compartments and substantially in their plane of symmetry.

14. The tank according to claim 1, wherein the compartments are made of a material providing a good heat exchange coefficient, or aluminium, or copper.

15. The tank according to claim 1, wherein the hydrogen storage material consists of at least one $A_m B_n$ type material consisting of an element A forming a stable hydride or alkaline or alkaline earth metals or lithium, calcium or magnesium, fourth or fifth column transition metals or zirconium, titanium or metal rare earth or lanthanum, cerium and of an element B forming an instable hydride under standard conditions, or transition metals or chromium, cobalt, nickel or iron.

16. A method for making a hydrogen storage tank according to claim 1, comprising:
    a) making channels having a transverse cross-section identical to those of the compartments;
    b) attaching transverse partition walls in the channels bounding the compartments;
    c) making a plate integral to the channels;
    d) placing the hydrogen storage material individually into each compartment;
    e) repeating a), b), c), d) until a required number of subassemblies is obtained;
    f) stacking the subassemblies;
    g) placing the stack into an enclosure; and
    h) feeding hydrogen.

17. The method for making a tank according claim 16, wherein the channels are made by folding a metal sheet.

18. The method for making a tank according to claim 16, wherein c) occurs before b) and wherein the plate tightly seals the cover channels.

19. The method for making a tank according to claim 16, wherein the stack is provided in a heat transfer fluid bath.

20. The method for making a tank according to claim 16, wherein during b), the plate is made integral to the bottoms of the channels, forming the cover of the lower stage.

21. The method for making a tank according to claim 20, wherein the ducts bounded between the channels and the cover of the lower stage are tightly connected to the heat exchange system.

* * * * *